(12) United States Patent
Hirota et al.

(10) Patent No.: US 8,493,233 B2
(45) Date of Patent: Jul. 23, 2013

(54) INFORMATION DISPLAY SYSTEM FOR VEHICLE

(75) Inventors: Tomoyuki Hirota, Chiba (JP); Shuji Maruyama, Chiba (JP); Kurozu Tomotaka, Chiba (JP)

(73) Assignees: Hyundai Motor Company, Seoul (KR); Kia Motors Corporation, Seoul (KR); Hyundai Motor Japan R&D Center, Inc., Yokohama (JP)

( * ) Notice: Subject to any disclaimer, the term of this patent is extended or adjusted under 35 U.S.C. 154(b) by 909 days.

(21) Appl. No.: 12/276,945

(22) Filed: Nov. 24, 2008

(65) Prior Publication Data

US 2009/0237268 A1 Sep. 24, 2009

(30) Foreign Application Priority Data

Mar. 18, 2008 (JP) .................................. 2008-069998

(51) Int. Cl.
*G08G 1/00* (2006.01)
(52) U.S. Cl.
USPC ........... 340/901; 340/933; 340/468; 340/438; 340/435
(58) Field of Classification Search
USPC .......................... 340/901, 933, 468, 435, 438
See application file for complete search history.

(56) References Cited

U.S. PATENT DOCUMENTS

| | | | | |
|---|---|---|---|---|
| 5,023,712 A | * | 6/1991 | Kajiwara | 348/139 |
| 5,168,355 A | * | 12/1992 | Asayama | 348/118 |
| 5,283,640 A | * | 2/1994 | Tilton | 348/42 |
| 5,304,980 A | * | 4/1994 | Maekawa | 340/435 |
| 5,510,990 A | * | 4/1996 | Hibino et al. | 701/96 |
| 5,617,085 A | * | 4/1997 | Tsutsumi et al. | 340/903 |
| 5,638,116 A | * | 6/1997 | Shimoura et al. | 348/118 |
| 5,963,148 A | * | 10/1999 | Sekine et al. | 340/905 |
| 6,067,110 A | * | 5/2000 | Nonaka et al. | 348/148 |
| 6,191,704 B1 | * | 2/2001 | Takenaga et al. | 340/903 |
| 6,424,273 B1 | * | 7/2002 | Gutta et al. | 340/937 |
| 6,476,855 B1 | * | 11/2002 | Yamamoto | 348/148 |
| 6,593,960 B1 | * | 7/2003 | Sugimoto et al. | 348/148 |
| 6,801,127 B2 | * | 10/2004 | Mizusawa et al. | 340/461 |
| 6,897,856 B2 | * | 5/2005 | Inaba et al. | 345/204 |
| 6,947,064 B1 | * | 9/2005 | Hahn et al. | 701/301 |
| 7,139,412 B2 | * | 11/2006 | Kato et al. | 382/104 |
| 7,167,779 B2 | * | 1/2007 | Kashiwada et al. | 701/1 |
| 7,212,653 B2 | * | 5/2007 | Sato et al | 382/104 |
| 7,222,009 B2 | * | 5/2007 | Hijikata et al. | 701/41 |
| 7,224,325 B2 | * | 5/2007 | Nagano et al. | 345/7 |
| 7,266,219 B2 | * | 9/2007 | Okamoto et al. | 382/104 |
| 7,369,939 B2 | * | 5/2008 | Imai et al. | 701/211 |
| 7,394,356 B2 | * | 7/2008 | Kumabe et al. | 340/436 |
| 7,466,338 B2 | * | 12/2008 | Xie | 348/148 |

(Continued)

FOREIGN PATENT DOCUMENTS

| | | |
|---|---|---|
| JP | 2001-315547 | 11/2001 |
| JP | 2002-369187 | * 12/2002 |

(Continued)

*Primary Examiner* — Benjamin C Lee
*Assistant Examiner* — Quang D Pham
(74) *Attorney, Agent, or Firm* — Edwards Wildman Palmer LLP; Peter F. Corless

(57) ABSTRACT

The present invention provides an information display system for a vehicle displaying a vehicle image overlapped with a panorama view image, and the information display system provides information around the vehicle, condition of the vehicle or information for a dangerous place to the driver with easy understand.

8 Claims, 5 Drawing Sheets

U.S. PATENT DOCUMENTS

| | | | |
|---|---|---|---|
| 7,548,634 B2* | 6/2009 | Kudo | 382/103 |
| 7,627,419 B2* | 12/2009 | Yoshida | 701/117 |
| 7,640,107 B2* | 12/2009 | Shimizu et al. | 701/523 |
| 7,642,931 B2* | 1/2010 | Sato | 340/995.1 |
| 7,729,516 B2* | 6/2010 | Shima et al. | 382/106 |
| 8,055,017 B2* | 11/2011 | Saito et al. | 382/103 |
| 8,179,241 B2* | 5/2012 | Sakai et al. | 340/436 |
| 2002/0018119 A1* | 2/2002 | Kogure et al. | 348/148 |
| 2002/0175999 A1* | 11/2002 | Mutobe et al. | 348/148 |
| 2003/0035050 A1* | 2/2003 | Mizusawa et al. | 348/148 |
| 2003/0069695 A1* | 4/2003 | Imanishi et al. | 701/301 |
| 2003/0108222 A1* | 6/2003 | Sato et al. | 382/104 |
| 2004/0105579 A1* | 6/2004 | Ishii et al. | 382/154 |
| 2004/0150589 A1* | 8/2004 | Mizusawa | 345/70 |
| 2004/0193331 A1* | 9/2004 | Kashiwada et al. | 701/1 |
| 2005/0040939 A1* | 2/2005 | Jobes et al. | 340/438 |
| 2005/0154505 A1* | 7/2005 | Nakamura et al. | 701/1 |
| 2005/0231341 A1* | 10/2005 | Shimizu | 340/436 |
| 2006/0055525 A1* | 3/2006 | Kubota et al. | 340/461 |
| 2006/0197761 A1* | 9/2006 | Suzuki et al. | 345/427 |
| 2007/0030212 A1* | 2/2007 | Shibata | 345/9 |
| 2007/0126564 A1* | 6/2007 | Lee et al. | 340/435 |
| 2007/0139523 A1* | 6/2007 | Nishida et al. | 348/148 |
| 2007/0159317 A1* | 7/2007 | Nagata | 340/461 |
| 2007/0279250 A1* | 12/2007 | Kume et al. | 340/903 |
| 2008/0055407 A1* | 3/2008 | Abe | 348/118 |
| 2009/0128630 A1* | 5/2009 | Kanaoka et al. | 348/148 |
| 2009/0140845 A1* | 6/2009 | Hioki | 340/425.5 |
| 2009/0140881 A1* | 6/2009 | Sakai et al. | 340/901 |
| 2009/0237268 A1* | 9/2009 | Tomoyuki et al. | 340/901 |
| 2012/0113261 A1* | 5/2012 | Satoh | 348/148 |

FOREIGN PATENT DOCUMENTS

| | | |
|---|---|---|
| JP | 2002-369187 A | 12/2002 |
| JP | 2005-196423 | 7/2005 |
| JP | 2006-090844 | 4/2006 |
| JP | 2006-262447 | 9/2006 |

* cited by examiner

INFORMATION DISPLAY SYSTEM FOR VEHICLE

CROSS-REFERENCE TO RELATED APPLICATION

This application claims under 35 U.S.C. §119(a) the benefit of Japanese Patent Application No. 2008-069998, the entire contents of which are incorporated herein by reference.

BACKGROUND (a) Technical Field

The present invention relates to an information display system for a vehicle. More particularly, the present invention relates to an information display system for a vehicle, which can display a panoramic view image showing the surrounding area of the vehicle along with a vehicle's image overlapped thereon.

(b) Background Art

Japanese unexamined patent application No. H11-78692 discloses a method of providing visual information with a driver, in which images of surrounding circumstance of a vehicle are taken by a plurality of cameras installed on the vehicle; the obtained images are processed to form a single surrounding image, a composite image having a virtual viewpoint from top of the vehicle is prepared; and the composite image is displayed on a display means equipped in the vehicle.

Such a method may not be suitable for providing sufficient visual information on circumstance while driving, since the viewpoint from top is restricted to very limited area.

Japanese unexamined patent publication No. 2007-158426 discloses a device for displaying the surrounding area of a vehicle. The device serves to form a single panoramic view image by combining a plurality of surrounding images and then overlaying an image of said vehicle onto the panoramic view image. The clarity of the object in the image varies depending on a distance between the object and the own vehicle.

The device adopts a virtual viewpoint from a rear side of the vehicle so that the displayed image also has a rear side viewpoint. Since such an image has a different viewpoint compared with an image which a driver really perceives through a windshield, the driver may experience confusion in determining the circumstance or information displayed on the device.

A solid image recognition method, in which the image is taken by a plurality of cameras and a distance to an object is calculated; a method of compensating distortion caused by a lens; and a image recognition method are disclosed in a non-patent material ("Solid image recognition" Tokyo industrial university, radio-isotope laboratory, saneyoshi lab. homepage, publicly available on the world wide web at ric.titech.ac.jp/saneken//stereocamera.htm.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides an information display system for a vehicle suitably comprising: a peripheral image memory part 3 storing a plurality of image data 103 shooting peripheral areas of the vehicle; a peripheral image process part 104 changing the image data 103 into one peripheral image data; a vehicle image process part 6 making vehicle data 106; an output image process part 7 suitably composing a composite image 107 of the peripheral image 104 and the vehicle image 106; a display part 8 suitably displaying the composite image 107; and a control part 9 suitably changing the display part 8 and executing image authentication, and wherein the peripheral image process part 4 or/and the output image process part 7 changes coordinates system of the composite image 107 into a panorama view coordinates system to make a panorama view image, and a virtual visual point 18 of the panorama view coordinates system is preferably a sight position of a driver 16 or on a center line of a vehicle width, and the peripheral image process part 4 or/and the output image process part 7 interprets the peripheral image 104, the composite image 107 or the panorama view image 108, and recognizes and extracts a dangerous place around the vehicle, and makes a dangerous place image 112, and overlaps the dangerous place image 112 with the panorama view image 108 to display at the display part 8.

In a preferred embodiment, the peripheral image process part 4 or the output image process part 7 suitably recognizes the dangerous place 12 through the peripheral image, the composite image or the panorama view image, and the peripheral image process part 4 or/and the output image process part 7 calculates a first distance data, which is preferably a distance between the dangerous place 12 and the vehicle 1, and measures a second distance data, which is preferably a distance between the dangerous place 12 and the vehicle 1 measured by a distance measuring sensor 12, to suitably measure the distance between the dangerous place 12 and the vehicle 1.

In another preferred embodiment, the peripheral image process part 4 or/and the output image process part 7 preferably has a marking 22 to display the dangerous place, and overlaps the marking with the dangerous place 12 of the panorama view image 108, and suitably changes one more of a size, brightness and a color or/and preferably uses an inserting screen 115 to suitably highlight at display part 8. Moreover, the peripheral image process part 6 draws a vehicle structure, which is a blind spot 17 of a driver's sight, as a semi-transparent image or/and a line drawing, and the vehicle structure is preferably overlapped with the panorama view image 108 through the output image process part 7 to display at the display part 8.

In still another preferred embodiment, the dangerous place 12 is preferably a place at which a lane width in front of the vehicle is narrowed, and the peripheral image process part 4 or/and the output image process part 7 displays the dangerous place 12 with two vertical lines 23 showing the vehicle width, and displays the distance between the dangerous place 12 and the vehicle 1 with a length of the vertical line 23, and preferably displays a relation between the lane width and the vehicle width with a color of the vertical line 23, and displays the vertical lines overlapped with the panorama view image 108 to highlight at the display part 8.

In still another preferred embodiment, the dangerous place 12 is preferably a traffic signal disposed at which the driver cannot see the traffic signal via a front window 20, and the peripheral image process part or/and the output image process part overlaps an image of the traffic signal 15 with the panorama view image 108 to highlight at the display part 8.

In still another preferred embodiment, the dangerous place 12 is preferably a person or an object 13 disposed at the blind spot 17 of the driver's sight, and the peripheral image process part 4 or/and the output image process part 7 overlaps an image of the person or the object 114 with the panorama view image 108 to highlight at the display part 8.

In still another preferred embodiment, the dangerous place 12 is an abnormal component 21 of the vehicle 1, and a main control part outputs data of the abnormal component to the vehicle image process part 6, and the vehicle image process part 6 suitably displays data of the abnormal component 21 overlapped with the panorama view image 108 to highlight at the display part 8. In further embodiments, the abnormal component is a light which is out of order, or the abnormal component is a component which a replacement dead line or maintain managing deadline is over.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
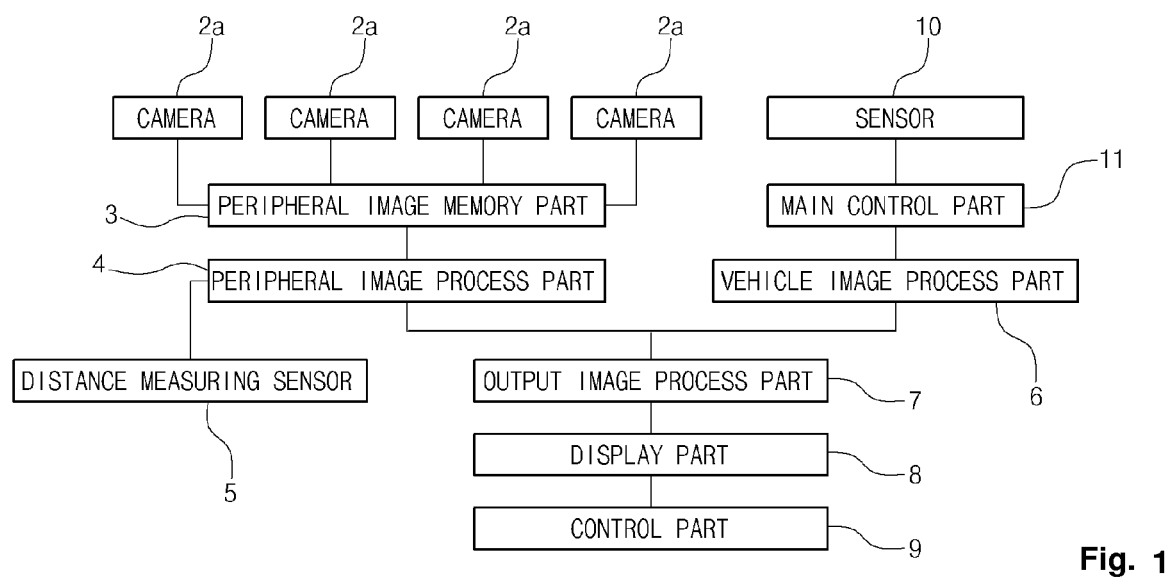
FIG. 1 is a block diagram showing an information display system for a vehicle in accordance with an embodiment of the present invention.

Reference numerals set forth in the Drawings includes reference to the following elements as further discussed below:

| | |
|---|---|
| 1: | vehicle |
| 2: | camera(2a~2d) |
| 3: | peripheral image memory part |
| 4: | peripheral image process part |
| 5: | distance measuring sensor |
| 6: | vehicle image process part |
| 7: | output image process part |
| 8: | display part |
| 9: | control part |
| 10: | sensor |

-continued

| | |
|---|---|
| 11: | main control part |
| 12: | dangerous place |
| 13: | person or object |
| 15: | traffic signal |
| 16: | driver |
| 17: | blind spot |
| 18: | virtual visual point |
| 20: | front window |
| 21: | abnormal component |
| 22: | symbol |
| 23: | vertical line |
| 24: | directional signal |
| 25: | ceiling |
| 26: | side window |
| 27: | bonnet |
| 100: | image |
| 103: | a plurality of images |
| 104: | peripheral image |
| 106: | vehicle image |
| 107: | composite image |
| 108: | panorama view image |
| 112: | danerous place image |
| 114: | person or object image |
| 115: | inserting screen |
| 116: | traffic signal image |
| 124: | directional signal |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an information display system for a vehicle comprising a peripheral image memory part that stores a plurality of image data obtained from shooting peripheral areas of the vehicle, a peripheral image process part that changes the image data into peripheral image data, a vehicle image process part making vehicle data, an output image process part composing a composite image of the peripheral image and the vehicle image, a display part displaying the composite image, and a control part changing the display part and executing image authentication, wherein the peripheral image process part or the output image process part changes a coordinates system of the composite image into a panorama view coordinates system to make a panorama view image.

In one embodiment, the information display system further comprises a virtual visual point of the panorama view coordinates system, wherein the virtual visual point of the panorama view coordinates system is a sight position of a driver or on a center line of a vehicle width, and the peripheral image process part or the output image process part interprets the peripheral image, the composite image or the panorama view image.

In another embodiment, the peripheral image process part or the output image process part further recognizes and extracts a dangerous place around the vehicle, makes a dangerous place image, and overlaps the dangerous place image with the panorama view image to display at the display part.

In a further embodiment, the peripheral image process part or the output image process part recognizes the dangerous place through the peripheral image, the composite image or the panorama view image, and the peripheral image process part or/and the output image process part calculates a first distance data, which is a distance between the dangerous place and the vehicle, and measures a second distance data, which is a distance between the dangerous place and the vehicle measured by a distance measuring sensor, to measure the distance between the dangerous place and the vehicle.

The invention also includes a motor vehicle comprising the information display system as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The invention features an information display system for a vehicle. In certain embodiments, the invention features a peripheral image memory part. Exemplary FIG. 1 is a block diagram showing an information display system for a vehicle preferably using four cameras 2a to 2d in accordance with a preferred embodiment of the present invention. A peripheral image memory part 3 stores image data of a plurality of images 103 obtained by peripheral cameras 2a to 2d, which collect peripheral images of a front, a rear, a left and a right sides of the vehicle 1. Preferably, the image data may be a suitable common plane coordinate system data.

In certain embodiments, the invention features a vehicle image process part. To a driver 16, for example, sight when driving comprises windows in the front, on both sides and a in the rear of the vehicle, and suitable sub-mirrors. In certain cases, a considerable amount of the sight of the driver 16 may be blocked by a vehicle body 1. Accordingly, in preferred embodiments of the invention, the vehicle image process part 6 preserves the image data of the vehicle body 1 seen by the driver 16.

In preferred embodiments, a main control part 11 of the vehicle 1 watches states of components by suitably disposing one or more sensors 10 at each part of the vehicle, and preferably outputs abnormal information of the component to the vehicle image process part 6 when a unusual signal is detected at the vehicle component. In further embodiments, the components may preferably be lights such as, but not limited to, a headlight, a winker, a hazard light and front and rear fog lamps. In certain embodiments, the driver may not notice the lights be turned off in certain conditions. In other embodiments, for example, the component may be an engine, peripheral devices of the engine having initial troubles or tires having abnormal tire pressure. In certain cases, defections of these components difficult for the driver to recognize, and considerable damages may be caused, for example, when the defections are left defective or unrecognized. Accordingly, suitable maintenance is needed to the components.

In further embodiments, the abnormal component 21 preferably includes components which need to be replaced regularly. For example, the components, which need to be replaced regularly, may be components that are after regular vehicle maintenance, for example an engine oil change. In further embodiments, data for the component, which needs to be replaced regularly, are stored at the main control part 11, and the data is preferably displayed at the vehicle image process part 6 when the period for regular maintenance, for example when the maintenance is due, is over. Moreover, in further embodiments, pollution level of the engine oil is suitably judged by previous replacing time and driving distances, and is displayed at the vehicle image process part 6 when the replacing deadline, e.g. the time for regular maintenance, is due.

In other embodiments, the vehicle image process part 6 makes suitable image data of the vehicle 1 showing the blind spot 17 of the sight of the driver 15, and the data of the abnormal components 21 is suitably transferred from the main control part 11 of the vehicle 1. Preferably, the blind spot 17 may be displayed as a semitransparent image or/and as line drawing.

In further embodiments, the invention features a peripheral process part and an output image part. Preferably, in a peripheral image process part 4, image data of images 103 are suitably changed and composed into one image data, and a distortion caused by a camera lens is compensated, and a peripheral image 104 having information around the vehicle 1 is suitably composed.

In further embodiments, an output image process part 7 overlaps the peripheral image 104 made at the peripheral image process part 4 with the vehicle image 106 made at the vehicle image process part 6 to suitably compose the composite image 107.

Preferably, the peripheral image process part 4 or/and the output image process part 7 suitably change the peripheral image 104 or the composite image 107 into a panorama view image 108 having a virtual visual point as a sight position of the driver 16 or a width center of the vehicle. In preferred embodiments of the present invention, the output image process part or the peripheral image process part may preferably change a plurality of the images 103 into the panorama view image 108 optionally.

In further embodiments, the peripheral image process part 4 or/and the output image process part 7 suitably process the image 100, and recognize and extract a dangerous place 12 to make a dangerous place image 112. In other further embodiments, the peripheral image process part 4 or the output image process part 7 may process the image 100 optionally.

In particular embodiments, the peripheral image process part 4 or/and the output image process part 7 may suitably have a symbol 22 marking the dangerous place 12, and preferably overlap the dangerous place 12 of the panorama view image 108 with the symbol 22 to highlight the dangerous place 12 by changing size, brightness or one more of colors of the symbol or/and using an insert image. In other embodiments, the symbol 22 may preferably be highlighted by flickering or using with alarm sound to be displayed at the display part 8.

In other embodiments, the invention features a panorama view image. A panorama view coordinate system is an image which is suitably obtained by rotating a sight direction at a wide angle continuously and vertically with respect to the virtual visual point 18. The image is suitably reflected at inner side of a cylinder including the virtual visual point 18 at a center axis. Preferably, in embodiments of the present invention, the panorama view image 108 is suitably defined as a plan view, which is made by cutting the cylinder and unrolling the inner side of the cylinder.

In further embodiments, when the panorama view image 108 is suitably composed by changing the image data of the images 103, the virtual visual point of the panorama view image 108 may preferably be a sight point of the driver 16 or around the sight point. Thus, in preferred embodiments, a display of the panorama view image 108 may be substantially the same with the sight recognized by eyes of the driver 16, so that the driver may understand the display of the panorama view image 108 immediately. In embodiments of the present invention, either of the driver sight or the center line in a direction of the vehicle width may be suitably chosen as a virtual visual point of the panorama view image 108.

In certain embodiments of the invention, a position of a headrest of the driver's seat is suitably detected by a position sensor or a position data of the driver's seat, and the position of the driver's sight may be suitably calculated by the position of the headrest.

In certain examples, when one point, which is preferably on a center line of the direction of the vehicle width and is in the vehicle, is suitably selected as the virtual visual point 18, the panorama view image 108, at which the virtual visual point 18 is a point close to the driver's sight, may be suitably obtained. The marking of the panorama view image 108 and the sight recognized by the eyes of the driver 16 are substantially the same, and the driver may understand the marking of the panorama view image 108. In further preferred embodiments, the virtual visual point on the center line of the direction of the vehicle width is a fixed point. Compared with when the driver's sight is the virtual visual point, the number of parameters for the image changing into the panorama view image 108 is decreased, and operation time of the changing data is suitably shortened.

In further embodiments, the invention features calculation of distance. Preferably, in the peripheral image process part 4 and/or the output image process part 7, the dangerous place 12 is suitably recognized and extracted from the image 100, and the data of the image 100 is suitably operated by a solid image recognition method to make a composite image 107 preferably including distance information and a measure of a first distance data between the dangerous place 12 and the vehicle 1. In certain embodiments of the invention, in measuring the distance by the solid image recognition method, the distance to the object may not be suitably calculated by miss match if a specific point extracted from the image data of the images 103 does not correspond respectively at each screen.

Accordingly, in further preferred embodiments, the distance measuring sensor 5 may suitably measure the distance, but may not recognize the dangerous place 12. Preferably, the recognition and the distance measuring of the dangerous place 12 by the solid image recognition method, and a second distance data to the dangerous place 12 by the distance measuring sensor 5 are compared, and the distance from the dangerous place 12 to the object is measured correctly.

In other embodiments, when the first distance data by the solid image recognition method is not measured, or when a difference between the first distance data and the second distance data by the distance measuring sensor 5 is more than predetermined error range, a credible value may be measured by re-measuring to display the credible value.

Figure 2:
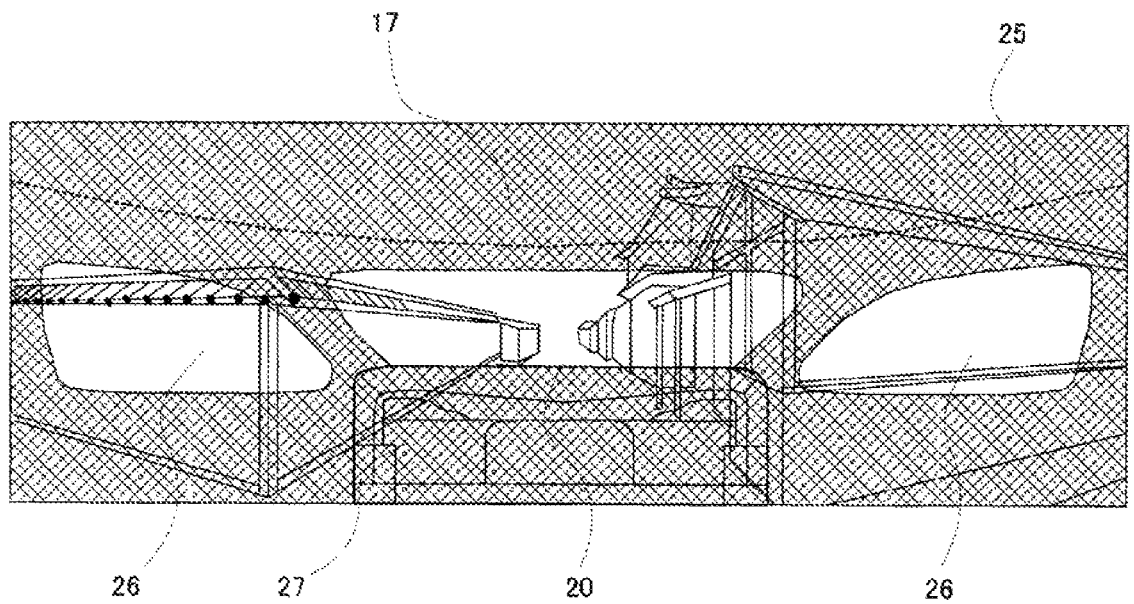
FIG. 2 is a panorama view image displayed at a display part in accordance with an embodiment of the present invention.

In other embodiments, the invention features a display part. In a display part, the panorama view image 108 is displayed. FIG. 2 is an exemplary panorama view image 108 displayed at a display part in accordance with an embodiment of the present invention. The vehicle image 106, which is blind spot 17 of the driver 16, is suitably overlapped semi-transparently and the bonnet 27 is suitably overlapped as the line drawing at the panorama view image 108 around a front, left and right of the vehicle 1.

In other embodiments, the invention features a control part. Preferably, according to an instruction of the driver 16, a view of the display part 8 is changed, enlarged and reduced, and abnormal signal is authenticated by an input of the control part 9. Preferably, an image for a rear of the vehicle 1 may be displayed by a control of the control part 9.

Figure 3:
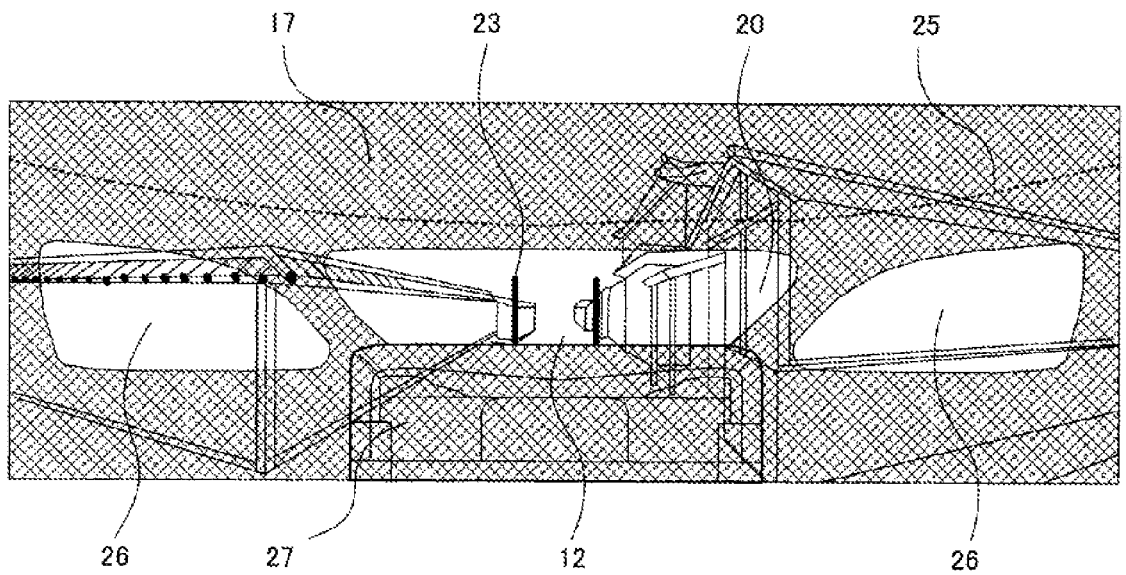
FIG. 3 is a panorama view image showing a dangerous place having a narrow road in front of the vehicle in accordance with an embodiment of the present invention.

Exemplary FIG. 3 is a panorama view image showing a dangerous place 12 having a narrow road in front of the vehicle in accordance with one embodiment of the present invention. Preferably, using the data of the panorama view image 108, the first distance data is suitably calculated by the solid image recognition method and the second distance data measured by a supersonic wave sensor, width information of a lane is suitably calculated, and whether the vehicle is able to pass through the lane is preferably displayed.

In further embodiments, two vertical lines 23 displaying the width of the vehicle are preferably displayed at the point, at which the width of the lane is narrowed, and a distance to the point or a arrival time is suitably displayed as three steps with a length of the vertical line 23. When the width of the lane is narrowed slightly and the vehicle may pass through the lane, the vertical line 23 is preferably displayed preferably as a blue color. In further exemplary embodiments, when the width of the vehicle is substantially the same with the width of the lane and the vehicle may pass through the lane with great care such as slow down, the vertical line 23 is displayed preferably as a yellow color. In other further exemplary embodiments, when the width of the lane is narrower than the width of the vehicle, the vertical line 23 is displayed preferably as a red color. Preferably, the dangerous place image 112 is made, and is suitably overlapped with the panorama view image 108 to display the dangerous place 12 and the vertical line 23 at the display part 8.

Figure 4:
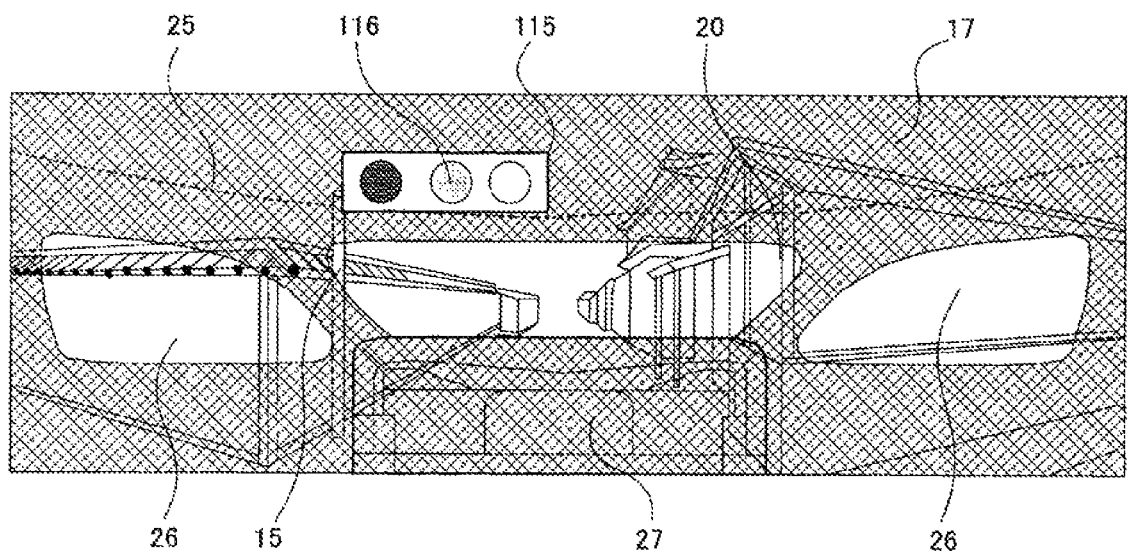
FIG. 4 is a panorama view image showing a traffic signal, which is not shown from a front window, in accordance with an embodiment of the present invention.

Exemplary FIG. 4 is a panorama view image showing a traffic signal 15, which is not shown from a front window, in accordance with a preferred embodiment of the present invention. Preferably, the output image process part 7 suitably recognizes the traffic signal 15 from the composite image 107, and the inserting screen 115 of the traffic signal is made by judging the distance of the traffic signal 15, which is suitably calculated with the data of the composite image 107 by the solid image recognition method, and, in further embodiments, the distance of the traffic signal is measured by the sensor. The inserting screen 115 is displayed with overlapping at the traffic signal 15 of the panorama view image 108 at the display part 8.

Figure 5:
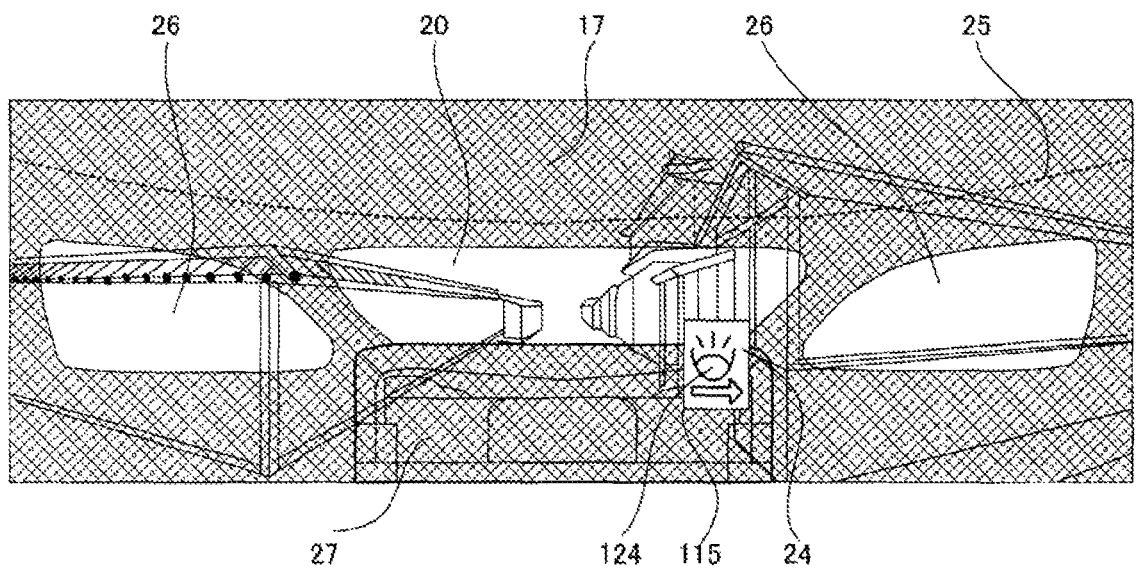
FIG. 5 is a panorama view image when a right signal light is out of order in accordance with an embodiment invention.

Exemplary FIG. 5 is a panorama view image when a right directional signal is suitably out of order in accordance with a preferred embodiment of the invention. In preferred embodiments, the main control part 1 of the vehicle 1 obtains information that the right directional signal is out of order, and the abnormal component information is suitably outputted to the vehicle image process part 6. The vehicle image process part 6 makes the vehicle image 106, preferably including the information that the directional signal 24 is out of order, and suitably displays a yellow marking 22 by using the inserting screen 115. The yellow marking suitably shows the directional signal 24 overlapping on the directional signal 24 of the panorama view image 108 through the output image process part 7.

According to embodiments of the present invention, the virtual visual point 18 of the panorama view image 108 is suitably disposed on the driver's sight or the center line of the vehicle width, and the driver 16 may see the panorama view image 108 which is substantially the same with the currently recognized sight.

In certain embodiments, the vehicle structure, which is a blind spot to the driver, is drawn as the semi-transparent image or the line drawing and is suitably overlapped with the panorama view image 108. Thus, the driver 16 may understand immediately the information of the blind spot 17 through the panorama view image 108. Moreover, in further embodiments, the detected danger 12 is overlapped with the dangerous place 12 of the panorama view image 108 by the symbol 22, and preferably one more of the size, the brightness and the color is changed or/and the inserting screen 115 is suitably used to highlight at the display part 8.

Preferably, by suitably using the display system of the present invention, the driver 16 does not feel incompatibility with the panorama view image 108, and may suitably understand the information delivered by the panorama view image 108. In certain cases, the driver understands the delivered information immediately. According to the display system of the present invention, the information around the vehicle or the condition of the vehicle may be delivered to the driver 16, preferably in a way that is easily understandable.

In a preferred embodiment, the first distance data is calculated by processing the data of the panorama view image 108, and the second distance data is preferably measured by the distance measuring sensor 5, so that the distance between the dangerous place 12 and the vehicle 1 is suitably measured. Thus, the distance between the dangerous place 12 and the vehicle 1 may be considered suitably credible.

In other preferred embodiments, the place at which the lane width in front of the vehicle is suitably narrowed, is extracted from the panorama view image 108 around the vehicle 1, and the vehicle width caution information showing the relation between the dangerous place and distance and the relation between the land width and the vehicle width may be suitably provided.

Thus, driving may become easier to the driver 16, and the blind spot 17 may be suitably reduced.

Preferably, a defect of an abnormal component, which may be difficult for the driver to detect, for example, but not limited to, damage to the lights, the initial defection of the engine, or the air pressure of the tires, may be suitably displayed at the position mounting the designated component of the vehicle image 106 in the panorama view image 108. Thus, information about the abnormal component may be suitably provided to the driver 16.

Moreover, in other embodiments, the replacement period of the engine oil or the component having the exchange dead line is suitably overlapped with the position mounting the component of the vehicle image 106 in the panorama view image 108 and is suitably displayed when the vehicle 1 is started. In preferred embodiments, the exchange time may be provided to the driver. Preferably, an accident may be preventable due to poor maintenance of the vehicle, thus the safety of the drive may be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An information display system for a vehicle comprising:
a peripheral image memory part configured to store a plurality of image data obtained from shooting peripheral areas of the vehicle;
a peripheral image process part configured to process the plurality of image data into one peripheral image data;
a vehicle image process part configured to generate a vehicle image;
an output image process part configured to generate a composite image of the peripheral image and the vehicle image;
a display part configured to display the composite image; and
a control part configured to control the display part and executing image authentication, wherein the peripheral image process part or/and the output image process part changes coordinates system of the composite image into a panorama view coordinates system to generate a panorama view image,
a virtual visual point of the panorama view coordinates system is a sight position of a driver or on a center line of a vehicle width, and
the peripheral image process part or/and the output image process part interprets the peripheral image, the composite image or the panorama view image, and recognizes and extracts a dangerous place around the vehicle, and generates a dangerous place image, and overlaps the dangerous place image with the panorama view image to display on the display part,
wherein the peripheral image process part or/and the output image process part recognizes the dangerous place through the peripheral image data, the composite image or the panorama view image, and the peripheral image process part or/and the output image process part calculates a first distance from the peripheral image data, the composite image or the panorama view image, which is a distance between the dangerous place and the vehicle, and measures a second distance, which is a distance between the dangerous place and the vehicle measured by a distance measuring sensor, to measure the distance between the dangerous place and the vehicle,
wherein the first distance data and the second distance data are compared to determine whether a difference between the first distance data and the second distance data is more than predetermined error range, the distance between the dangerous place and the vehicle is re-measured to display a credible distance on the display part;
wherein the image data is operated by a solid image recognition method to generate the composite image including distance information and a measure of the first distance between the dangerous place and the vehicle, and using the data of the panorama view image, the first distance data is calculated by the solid image recognition method,
wherein the vehicle image includes a vehicle structure which is a blind spot of the driver's sight, and states of vehicle components monitored by disposing one or more sensors at each component of the vehicle; and
wherein a semi-transparent view image of said vehicle image is overlapped onto the panorama view image allowing the driver to visualize the portions of the panorama view that are covered by the vehicle created blind spot.

2. The information display system of claim 1,
wherein the dangerous place is a place at which a lane width in front of the vehicle is narrowed,
the peripheral image process part or/and the output image process part displays the dangerous place with two vertical line showing the vehicle width, and displays the distance between the dangerous place and the vehicle with a length of the vertical line, and display a relation between the lane width and the vehicle width with a color of the vertical line, and displays the vertical lines overlapped with the panorama view image to highlight at the display part.

3. The information display system of claim 1,
wherein the dangerous place is a traffic signal disposed at which the driver cannot see the traffic signal via a front window, and the peripheral image process part or/and the output image process part overlaps an image of the traffic signal with the panorama view image to highlight at the display part.

4. The information display system of claim 1,
wherein the dangerous place is a person or an object disposed at the blind spot of the driver's sight, and
the peripheral image process part or/and the output image process part overlaps an image of the person or the object with the panorama view image to highlight at the display part.

5. The information display system of claim 1, wherein the dangerous place is an abnormal component of the vehicle, a main control part receives abnormal information from the one or more sensors and outputs data of the abnormal component to the vehicle image process part, and the vehicle image process part displays data of the abnormal component overlapped with the panorama view image to highlight at the display part.

6. The information display system of claim 5,
wherein the abnormal component is a light which is out of order.

7. The information display system of claim 5,
wherein the abnormal component a component which a replacement dead line or a maintain managing deadline is over.

8. A vehicle comprising the information display system of claim 1.

* * * * *